Feb. 4, 1941.    R. G. AURIEN    2,230,605
BRAKE ARRANGEMENT
Filed May 31, 1940    2 Sheets-Sheet 1
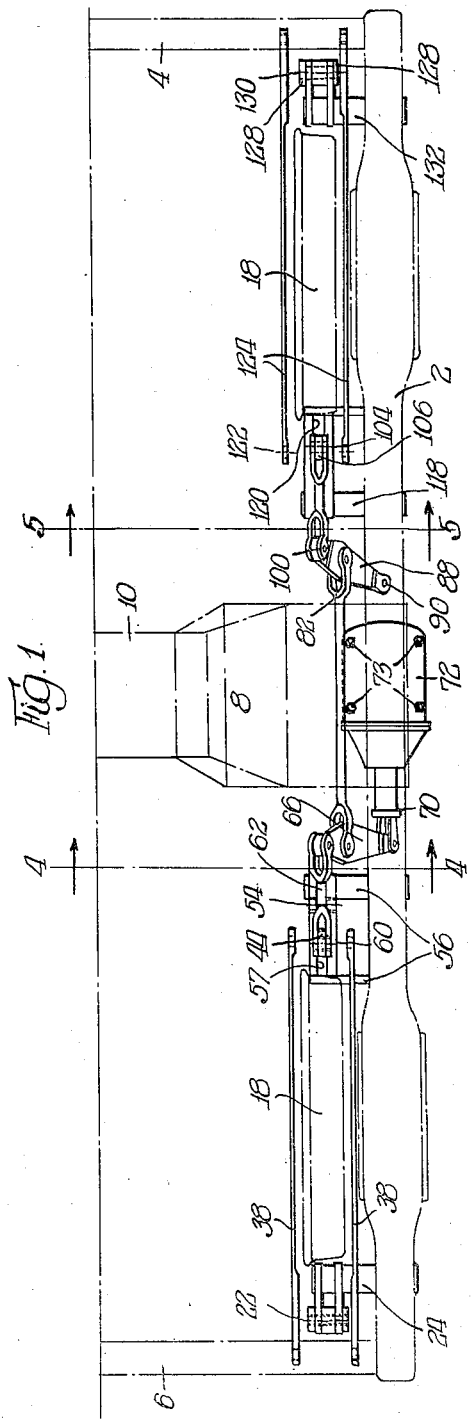
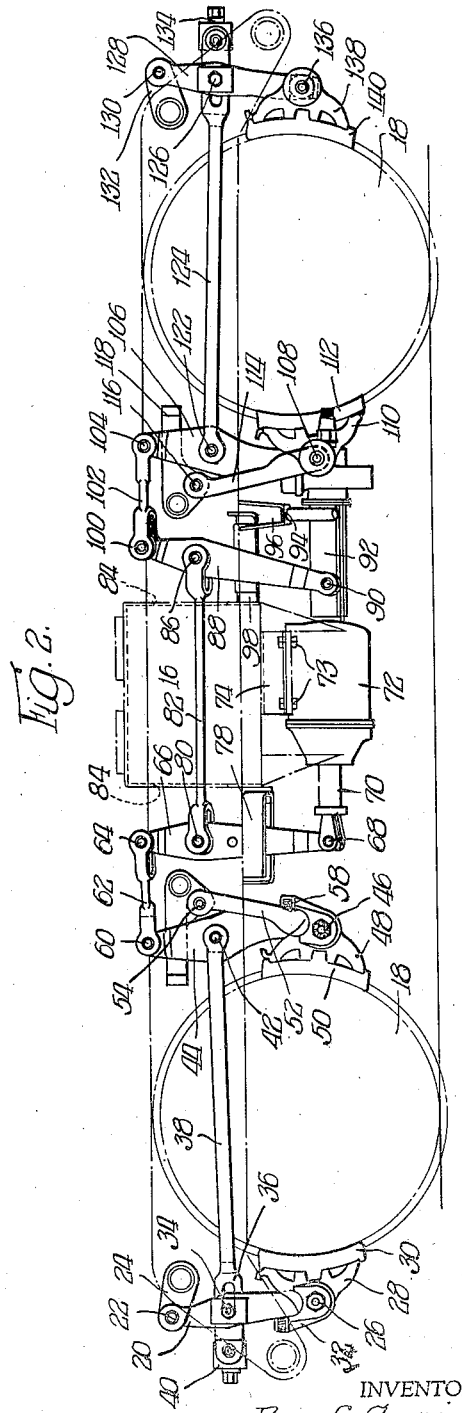
INVENTOR.
Ray G. Aurien,
BY Feb. 4, 1941.   R. G. AURIEN   2,230,605
BRAKE ARRANGEMENT
Filed May 31, 1940   2 Sheets-Sheet 2
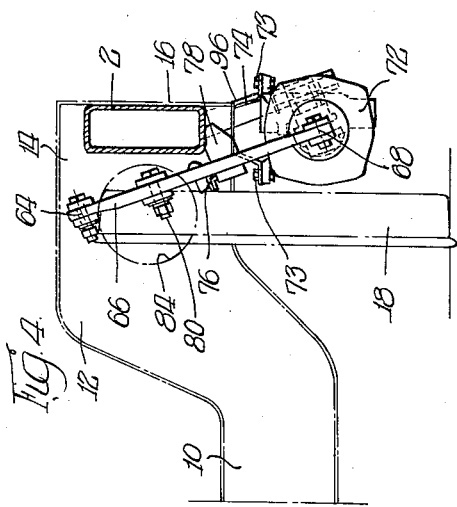
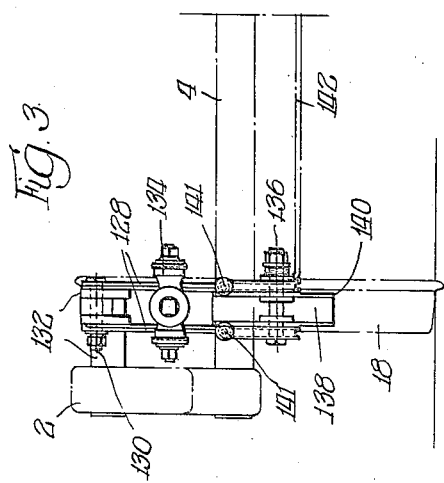
INVENTOR.
Ray G Aurien,
BY
attij Patented Feb. 4, 1941

2,230,605

UNITED STATES PATENT OFFICE 2,230,605

BRAKE ARRANGEMENT

Ray G. Aurien, Chicago, Ill., assignor to American Steel Foundries, Chicago, Ill., a corporation of New Jersey Application May 31, 1940, Serial No. 338,023

18 Claims. (Cl. 188—56)

My invention relates to brake rigging for a railway car truck and more particularly to such a type of rigging wherein brake heads and brake shoes are supported at opposite sides of each wheel, commonly designated clasp brakes.

An object of my invention is to design a clasp brake arrangement for a high speed railway car truck which is particularly applicable to a relatively rigid framework comprising spaced side members and a connecting bolster or load carrying member wherein said bolster is afforded a jaw-like end for reception of the side frame at each side of the truck.

My invention comprehends a clasp brake arrangement for such a truck as that described wherein the bolster will be afforded openings to accommodate a pull rod therethrough for connection of the brake rigging at opposite ends of the truck.

My invention also contemplates such an arrangement as that described wherein power means for operating the brake rigging is supported at the bottom of the bolster end and wherein slack adjuster means is supported at one end of the power means for automatic adjustment of the cylinder levers.

For the sake of clarity in certain of the figures details are omitted where they are more clearly set forth in other views.

In the drawings

Figure 1 is a top plan view of a car truck embodying my invention, only one-half of the structure being shown inasmuch as the arrangement is similar at opposite sides of the truck.

Figure 2 is a side elevation of the truck and brake arrangement shown in Figure 1.

Figure 3 is an end elevation thereof, taken from the right as seen in Figures 1 and 2.

Figure 4 is a sectional view taken in the vertical transverse plane substantially as indicated by the line 4—4 of Figure 1, and Figure 5 is a further sectional view taken in a transverse vertical plane substantially as indicated by the line 5—5 of Figure 1.

Figure 6 is a top plan view of the truck and brake arrangement more or less diagrammatic in form, showing the entire truck.

Describing the structure in greater detail, the truck frame comprises spaced side members 2, 2 joined at opposite ends of the truck by the end members 4 and 6, each of said side members comprising a section of the general form best seen in the sectional view of Figures 4 and 5. The bolster 8 has a depressed central portion 10 and raised end portions 12, 12 at the extremities of which are afforded jaw-like means 14 within which may be embraced the side frame 2 and said side frame may be secured in position as by welding the plate member 16 across the jaw portion 14 after assembly. Conventional journal arrangements (not shown) are afforded for the wheel and axle assemblies 18, 18.

The brake arrangement is similar at opposite sides of the truck and comprises the paired hanger levers 20, 20 (Figure 2, left) pivoted at their upper ends as at 22 from the bracket 24 which is supported from the side frame, said hanger levers supporting at their lower ends as by a pivotal connection as at 26 the brake head 28 and the brake shoe 30 for engagement with the periphery of the adjacent wheel, said head being afforded balance means 32 of well known form. Intermediate the ends of the hanger lever 20 are pivotally and adjustably connected as at 34 the slotted ends 36, 36 of the paired wheel straps 38, 38, said slotted ends affording connection to the manual slack adjuster 40 at the extremity thereof. The opposite end of the pull rod 38 has a pivotal connection as at 42 to the live truck lever 44 on the lower end of which is pivotally supported as at 46 the brake head 48 and the brake shoe 50 for engagement of the opposite periphery of the last-mentioned wheel. Also connected at the pivot point 46 are the paired hangers 52, 52 and the upper ends of said hangers are pivotally supported as at 54 from the bracket 56 on the inboard face of the side frame 2. The said bracket 56 is slotted intermediate its ends to afford guide means as at 57 for the upper end of the live truck lever 44. Balancing means for the head 48 are afforded as at 58. The upper end of the live truck lever 44 has a pivotal connection as at 60 to the link or pull rod 62, the opposite end of which is pivotally connected as at 64 to the approximately vertical live cylinder lever 66 and the lower end of said lever is pivotally connected as at 68 to the piston 70 of the cylinder 72 which is secured as at 73, 73 on the bracket 74 mounted on the bottom wall of the jaw portion 14 of the bolster end. Guide means for the live cylinder lever 66 is afforded as at 76 by the slotted support bracket 78, said lever extending through the slot thereof. Above the guide bracket 78 and intermediate the ends of the live cylinder lever 66 is pivotally connected as at 80 the pull rod 82, said pull rod extending through the aligned openings 84, 84 afforded in the spaced walls of the end portion 12 of the bolster and the opposite end of said pull rod has a pivotal connection as at 86 to the dead cylinder lever 88 whose lower end is adjustably fulcrumed as at 90 from the slack adjuster 92 which is mounted on the closed end of the cylinder 72, the extending end of said slack adjuster being afforded support as at 94 from the side frame 2 through the medium of the bracket 96. Guide means is afforded for the dead cylinder lever 88 intermediate its ends by the bracket 98 secured to the side frame and bolster. The upper end of the dead cylinder lever 88 has a pivotal connection as at 100 to the link or pull rod 102, the opposite end of which is pivotally connected as at 104 to the upper end of the live truck lever 106 and at the lower end of said lever is pivotally supported as at 108 the brake head 110 and the brake shoe 112 for engagement with the periphery of the adjacent wheel. The head 112 is afforded balancing means 113 (Figure 5) of well known form. Also connected at the pivotal point 108 are the lower ends of the paired hangers 114, 114, the upper ends whereof are hung as at 116 from the bracket 118 secured to the side frame 2. The said bracket 118 is slotted intermediate its ends to afford guide means as at 120 for the upper end of said live truck lever 106. Intermediate the ends of the live truck lever 106 are pivotally connected as at 122 the paired wheel straps 124, 124, the opposite ends of which straps are pivotally and adjustably connected as at 126 to a point intermediate the ends of the paired hanger levers 128, 128, said hanger levers being pivotally supported at their upper ends as at 130 from the bracket 132 secured to the side frame 2. The wheel straps 124 are slotted at their ends to accommodate the manual slack adjuster 134, serving as a means of adjusting the position of the pivot point 126. At the lower end of the hanger lever 128 as at 136 is pivotally hung the brake head 138 and the supported shoe 140 arranged for engagement with the opposite periphery of the last-mentioned wheel. Balancing means of well known form are afforded for the brake head 138 as at 141, 141 (Figure 3). The brake heads at each end of the truck and at opposite sides thereof are secured against too great lateral movement by tie straps 142, 142.

In operation actuation of the power means at each side of the truck will rotate the cylinder levers 66 and 88 and apply the brake shoes to the wheels at opposite ends of the truck by movement of the live and dead brake levers at opposite sides of each wheel and in a manner clear to those skilled in the art.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at opposite ends of the truck comprising live and dead levers associated with each wheel, straps connecting said live and dead levers intermediate their ends for each wheel, brake heads and brake shoes supported at the lower ends of said levers, hangers supporting the live truck levers intermediate the wheels, live and dead cylinder levers connected at opposite ends of said power means and connected at corresponding ends to the live truck levers associated with wheels at opposite ends of the truck, and a pull rod extending through said opening and connecting said cylinder levers, the connection of one of said cylinder levers to said power means being automatically adjustable.

2. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at opposite ends of the truck comprising hanger levers outwardly of the wheels, live truck levers intermediate the wheels, straps extending above the axles and connecting the hanger lever and live truck lever associated with each wheel, brake heads and brake shoes supported at the lower ends of said hanger levers and live truck levers, live and dead cylinder levers connected at their lower ends to opposite ends of said power means and connected at their upper ends to said live truck levers respectively, and a pull rod extending through said opening and connecting points intermediate the ends of said cylinder levers.

3. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at opposite ends of the truck comprising live and dead levers associated with each wheel, straps connecting said live and dead levers intermediate their ends for each wheel, brake heads and brake shoes supported at the lower ends of said levers, hangers supporting the live truck levers intermediate the wheels, live and dead cylinder levers connected at opposite ends of said power means and connected at corresponding ends to the live truck levers associated with wheels at opposite ends of the truck, and a pull rod extending through said opening and connecting said cylinder levers.

4. In a brake arrangement for a four wheel railway car truck, a frame comprising spaced side members and a connecting bolster having jaw ends embracing said members at opposite sides of the truck, an opening through said bolster adjacent each side member and inboard thereof, power means mounted on the jaw end beneath said side member at each side of the truck, and braking means for each side of the truck comprising dead truck levers supported outwardly of the wheels, live truck levers supported intermediate the wheels, over-axle straps connecting the truck levers associated with each wheel, live and dead cylinder levers connected at their lower ends to opposite ends of the power means and at their upper ends to said live truck levers respectively, and a pull rod extending through said bolster opening and connecting points intermediate the ends of said cylinder levers, the connection of one of said cylinder levers to said cylinder being automatically adjustable.

5. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at opposite ends of the truck comprising live truck levers intermediate the wheels, and live and dead cylinder levers connected at their upper ends to said live truck levers and operatively connected intermediate their ends, said operative connection comprising a pull rod extending through said opening, said cylinder levers being connected at their lower ends to opposite ends of said power means, the connection of said dead cylinder lever to said power means being automatically adjustable.

6. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at each end of the truck comprising hanger levers outwardly of the wheels, live truck levers intermediate the wheels, straps connecting intermediate points of the live lever and hanger lever associated with each wheel, live and dead cylinder levers connected at opposite ends of said power means, a pull rod extending through said opening and connecting intermediate ends of said cylinder levers, and operative connections between said cylinder levers and said live truck levers respectively.

7. In a brake arrangement for a railway car truck having spaced wheel and axle assemblies, a frame comprising a side member and a bolster, said bolster having a jaw end embracing said side member and an opening therethrough inwardly of said side member, power means mounted on said jaw end beneath said side member, and braking means for the wheels at opposite ends of the truck comprising live and dead levers at opposite sides of each wheel, pull rods connecting the levers for each wheel, cylinder levers connected at corresponding ends to said live truck levers, a pull rod extending through said opening and connecting said cylinder levers at points intermediate their ends, said cylinder levers having their other corresponding ends connected at opposite ends of said power means, one of said last-mentioned connections being automatically adjustable.

8. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, and braking means for each wheel comprising hanger levers supported outwardly of the wheels, live truck levers supported intermediate the wheels, pull rods connecting the levers associated with each wheel, live and dead cylinder levers connected at their lower ends to said power means and at their upper ends to said live truck levers respectively, and a pull rod extending through said opening and connecting intermediate points of said cylinder levers.

9. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, and braking means for each wheel comprising hanger levers supported outwardly of the wheels, live truck levers supported intermediate the wheels, pull rods connecting the levers associated with each wheel, live and dead cylinder levers connected at their lower ends to said power means and at their upper ends to said live truck levers respectively, a pull rod extending through said opening and connecting intermediate points of said cylinder levers, and a slotted bracket secured to said side frame and bolster and affording guide means for said live cylinder lever.

10. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, and braking means for each wheel comprising hanger levers supported outwardly of the wheels, live truck levers supported intermediate the wheels, pull rods connecting the levers associated with each wheel, live and dead cylinder levers connected at their lower ends to said power means and at their upper ends to said live truck levers respectively, a pull rod extending through said opening and connecting intermediate points of said cylinder levers, and guide brackets on said frame for said cylinder levers.

11. In a brake arrangement for a four wheel railway car truck, a frame comprising spaced side members and a connecting bolster having jaw ends embracing said members at opposite sides of the truck, an opening through said bolster adjacent each side member and inboard thereof, power means mounted on the jaw end beneath said side member at each side of the truck, and braking means for each side of the truck comprising dead truck levers supported outwardly of the wheels, live truck levers supported intermediate the wheels, over-axle straps connecting the truck levers associated with each wheel, live and dead cylinder levers connected at their lower ends to opposite ends of the power means and at their upper ends to said live truck levers respectively, and a pull rod extending through said bolster opening and connecting points intermediate the ends of said cylinder levers.

12. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at opposite ends of the truck comprising hangers supporting live truck levers intermediate the wheels, live and dead cylinder levers connected at their lower ends to said power means, a pull rod extending through said opening and connecting said live and dead cylinder levers, and operative connections between said live truck levers and said cylinder levers respectively.

13. In a clasp brake arrangement for a railway car truck, a frame, spaced supporting wheel and axle assemblies, said frame comprising a side member and a transverse bolster having a jaw end embracing said side member, power means supported on said jaw end beneath said side member, said bolster having an opening inboard said side member in the plane thereof, braking means for the wheels at opposite ends of the truck comprising live truck levers intermediate the wheels, and live and dead cylinder levers connected at their upper ends to said live truck levers and operatively connected intermediate their ends, said operative connection comprising a pull rod extending through said opening, said cylinder levers being connected at their lower ends to opposite ends of said power means.

14. In a brake arrangement for a railway car truck having spaced wheel and axle assemblies, a frame comprising a side member and a bolster, said bolster having a jaw end embracing said side member and an opening therethrough inwardly of said side member, power means mounted on said jaw end beneath said side member, and braking means for the wheels at opposite ends of the truck comprising live and dead levers at opposite sides of each wheel, pull rods connecting the levers for each wheel, cylinder levers connected at corresponding ends to said live truck levers, a pull rod extending through said opening and connecting said cylinder levers at points intermediate their ends, said cylinder levers having their other corresponding ends connected at opposite ends of said power means.

15. In a brake arrangement for a railway car truck having spaced wheel and axle assemblies, a frame comprising a side member, a bolster having a jaw end embracing said side frame, power means and slack adjuster means supported from said bolster beneath said side member, and braking means comprising live and dead truck levers supported on opposite sides of each wheel, pull rods connecting the levers associated with each wheel, live and dead cylinder levers connected at their lower ends to said power means and said slack adjuster respectively, a pull rod extending through said bolster and connecting said cylinder levers intermediate their ends, and connections between the upper ends of said cylinder levers and said live truck levers.

16. In a brake arrangement for a railway car truck having spaced wheel and axle assemblies, a frame comprising a side member, a bolster having a jaw end embracing said side member, power means supported on said jaw end beneath said side member, and brake rigging comprising interconnected live and dead truck levers supported at opposite sides of each wheel, live and dead cylinder levers connected to said live truck levers intermediate the wheels, and a pull rod connecting points intermediate the ends of said cylinder levers and extending through said bolster end, said cylinder levers being operatively connected at opposite ends of said power means.

17. In a railway car truck, a frame comprising spaced side members and a connecting bolster, said bolster having jaw ends embracing said members respectively, and braking means for each side of the truck comprising power means mounted on said jaw end beneath the side member, live and dead cylinder levers connected to opposite ends of said power means, a pull rod extending through said bolster end connecting intermediate points of said cylinder levers, braking means for the wheels at each end of the truck including live truck levers intermediate the wheels, and pull rods connecting corresponding ends of said cylinder levers to adjacent live truck levers.

18. In a brake arrangement for a four wheel railway car truck, a frame having a side member and a bolster having an opening therethrough, spaced supporting wheel and axle assemblies, power means supported on said bolster beneath said side frame, and a brake means for the wheels at one side of the truck including live truck levers intermediate the wheels, cylinder levers connected at corresponding ends to opposite ends of said power means and at their other corresponding ends to said live truck levers respectively, and a pull rod connecting said cylinder levers through said opening.

RAY G. AURIEN.